United States Patent

Shono

[11] Patent Number: 5,848,306
[45] Date of Patent: Dec. 8, 1998

[54] AUTOMATIC STROBE PHOTOGRAPHING SYSTEM

[75] Inventor: Tetsuji Shono, Tokyo, Japan

[73] Assignee: Asahi Kogaku Kogyo Kabushiki Kaisha, Tokyo, Japan

[21] Appl. No.: 755,554

[22] Filed: Nov. 22, 1996

[30] Foreign Application Priority Data

Nov. 22, 1995 [JP] Japan ................................. 7-328288

[51] Int. Cl.⁶ ........................... G03B 15/03; G03B 17/00
[52] U.S. Cl. ........................ 396/198; 396/180; 396/532
[58] Field of Search .................... 396/159, 160, 396/180, 194, 195, 199, 529, 532, 462, 198; 315/241 P

[56] References Cited

U.S. PATENT DOCUMENTS

| | | | |
|---|---|---|---|
| Re. 35,196 | 4/1996 | Iwamoto et al. ........................ | 396/180 |
| 1,913,848 | 6/1933 | Miskella ................................. | 396/195 |
| 3,593,633 | 7/1971 | Shimomura ............................ | 396/195 |
| 4,449,802 | 5/1984 | Nakamura .............................. | 396/180 |
| 4,550,996 | 11/1985 | Taniguchi et al. ..................... | 396/195 |
| 4,755,845 | 7/1988 | Taniguchi et al. ..................... | 396/180 |
| 4,920,371 | 4/1990 | Kaneko .................................. | 396/195 |
| 4,999,663 | 3/1991 | Nakamura .............................. | 396/89 |
| 5,148,212 | 9/1992 | Serikawa et al. ...................... | 396/180 |

*Primary Examiner*—Safet Metjahic
*Assistant Examiner*—Nicholas J. Tuccillo
*Attorney, Agent, or Firm*—Greenblum & Bernstein, P.L.C.

[57] ABSTRACT

Disclosed is an automatic strobe photographing system in which a camera body having an at least a Q contact, a lens provided with a lens shutter mechanism, and an X contact, a strobe device having an X terminal and Q terminal are provided. The strobe device starts emitting light when a predetermined signal is input to the X terminal, and stops emitting light when a predetermined signal is input to the Q terminal. A connecting device is further provided, which connects the X contact of the lens with the X terminal of the strobe device, and the Q contact of the camera body with the Q terminal of the strobe device.

15 Claims, 6 Drawing Sheets

AUTOMATIC STROBE PHOTOGRAPHING SYSTEM

FIELD OF THE INVENTION

The present invention relates to an automatic strobe photographing system which enables a strobe-synchronized photographing.

BACKGROUND OF THE INVENTION

Conventionally, medium size cameras, for example, cameras using a Brownie film, and using exchangeable lenses have been know. Generally, when photographing is executed with such cameras, an aperture mechanism provided inside the exchangeable lens is driven to define an aperture, and a focal plane shutter provided in the camera body is used to exposed a film to light.

In order to perform a strobe-synchronized photographing in which light emission of the strobe is executed synchronously with an exposure operation, light of the strobe should be emitted while the entire frame of the film plane is exposed to the light. The focal plane shutter operates such that a leading curtain is driven to open an optical path (i.e., a photographing frame) to expose a film to light, and then a trailing curtain is driven to close the optical path. A shutter speed is defined as an interval between the opening and closing of the optical path by the leading and trailing curtains of the focal plane shutter.

When the strobe-synchronized photographing is performed, the shutter speed is set such that the trailing curtain starts closing the photographing frame after the leading curtain of the focal plane shutter has completely opened the photographing frame. The strobe is to emit light only while the film frame is exposed completely, and not when the leading or trailing curtain is running.

When the shutter speed is relatively fast, the trailing curtain starts closing the photographing frame before the leading curtain completes opening. Therefore, if the strobe is to be used (i.e., to emit light) to perform the strobe-synchronized photographing, the shutter speed is limited so that there is a sufficient period between the completion of opening of the leading curtain, and the starting of the closing of the trailing curtain. Therefore, when the focal plane shutter is used, strobe-synchronized photographing cannot be done when the shutter speed is relatively high.

In order to deal with the above problem, conventionally, the lens provided with a lens shutter mechanism is used together with the camera body having the focal plane shutter system when the strobe is used. The lens provided with the lens shutter mechanism has an aperture mechanism having aperture blades for defining the aperture of the lens, and shutter sectors for opening/closing the optical path, and the aperture mechanism and the shutter mechanism are separately provided inside the lens.

FIG. 6 is a block diagram showing a conventional photographing system including a camera body 1 having the focal plane shutter system, a lens 2 provided with the lens shutter mechanism, and a strove device 3. The photographing system employs an interchangeable lens system, and in FIG. 6, the lens 2 having the lens shutter mechanism is coupled to the camera body 1.

In the camera system shown in FIG. 6, when a shutter button 15 of the camera 1 is depressed, a camera side engaging member 1C is driven. As the engaging member 1C is driven, a lens side engaging member 2C which is mechanically connected to the camera side engaging member 1C is driven. Through the engaging member 2C, a driving force of the engaging member 1C is transmitted to a shutter/aperture driving mechanism 2D provided inside the lens 2. The shutter/aperture driving mechanism 2D drives a shutter 2S first to completely close the optical path, and drives an aperture system 2A to change the aperture size from a full open aperture to a preset, for example, a manually set aperture size. Thereafter (while the shutter 2S is closed), the focal plane shutter of the camera 1 is fully opened (i.e., the leading curtain is fully opened, and the trailing curtain has not yet run). Then, in this condition, the shutter 2S of the lens 2 is moved from a completely closed position to a fully open position. The full opening of the shutter 2S is detected by a sensor 2M. Upon detection of the full open of the shutter 2S, the sensor 2M outputs a signal X to an X terminal 2X. As a preset exposure period has elapsed, the shutter 2S is moved from the fully opened position to the closed position, and thereafter, the trailing curtain of the focal plane shutter of the camera body 1 is driven to close the picture frame. After the focal plane shutter is closed, the lens shutter 2S is opened again and a photographing operation is completed.

If the strobe device 3 is used to emit light when photographing is executed, the light emission is controlled as follows: When the X signal output to terminal 2 from detector 2M is transmitted to a strobe device 3 through an X signal input terminal 3X of the strobe device 3, i.e., synchronously with the output of the X signal, the strobe starts emitting light. In other words, the strobe flashes synchronously with the full opening of the shutter 2S of the lens 2.

When the camera 2 uses a normal lens (the lens which does not have the lens shutter mechanism), both the start and end of the light emission of the strobe device 3 is controlled. When the normal lens is coupled to the camera body 1, instead of the lens having the lens shutter mechanism, an X signal input terminal 3X and a Q terminal (not shown) of the strobe device 3 are electrically connected to the X terminal and a Q terminal (not shown) of the camera body 1. The camera body 1 outputs the X signal when the leading curtain of the focal plane shutter fully opens as described before. Further, in order to limit the light amount of the strobe flashing, the camera body 1 has a light receiving element which receives light incident through the lens and reflected by the film surface, integrates the received light, compares the integrated value with a reference value and generates a Q signal (quench signal) when the integrated value exceeds a predetermined reference value. The conventional strobe device 3 is designed such that upon reception of the Q signal, it stops emitting light. Accordingly, when the camera body 1 outputs the X signal, the strobe device start emitting light, and upon reception of the Q signal, the strobe device 3 stops emitting light. Thus, both starting and ending of the light emission can be controlled when the normal lens is used. However, as described before, the shutter speed is limited to a relatively slow speed since the light emission is done only after the leading curtain is fully opened.

When the lens provided with the lens shutter mechanism is coupled to the camera body having the focal plane shutter, and the strobe photographing is performed, the strobe device is electrically connected to the lens. Since the strobe device starts strobe flashing synchronously with the full opening of the lens shutter, the X signal output from the lens is used as a trigger signal for starting the emitting of light. In this case, however, the lens does not have function to output the Q signal, and only the X signal is transmitted from the lens to the strobe device. Accordingly, when the lens provided with the lens shutter is attached to the camera having the focal plane shutter mechanism, and strobe photographing is performed, the strobe device does not stop emitting light automatically. The user is obliged to manually preset the light amount to be emitted. Accordingly, it is troublesome to use a strobe device together with a camera body having a focal plane shutter mechanism when the lens having the lens shutter mechanism is coupled to the camera body.

SUMMARY OF THE INVENTION

To solve the above problem, it is an object of the invention to provide an improved automatic strobe system with which the start and termination of strobe flashing (light emission) is automatically performed, and to provide a strobe adapter which enables the configuration of the above-described camera system.

For the above object, there is provided an automatic strobe photographing system, comprising a camera body having at least a Q contact; a lens provided with a lens shutter mechanism, the lens having an X contact; a strobe device having an X terminal and Q terminal, the strobe device emitting light when a predetermined signal is input to the X terminal, the strobe device being prevented from emitting light when a predetermined signal is input to the Q terminal; and a connecting device which connects the X contact with the X terminal, and the Q contact with the Q terminal.

The camera may have a light amount detecting system, the predetermined signal being output from the Q contact when the light amount detecting system detects that a predetermined amount of light is incident to the camera body through the lens.

Optionally, the camera body further comprises a shutter system, and an X contact, a predetermined signal being output from the X contact when the shutter system is driven to open.

The automatic strobe photographing system may employ an interchangeable lens system. When a lens which does not have the lens shutter mechanism is coupled to the camera body, the X and Q terminals of the strobe device are connected to the X and Q contacts provided on the camera body, respectively.

Further, the camera body has a hot shoe where the X and Q contacts are provided, and the strobe has a mounting portion to be coupled to the hot shoe, the X and Q terminals being provided on the mounting portion of the strobe device such that the X and Q terminals of the strobe device contact the X and Q contacts of the camera body when the mounting portion is directly coupled to the hot shoe.

Optionally, the connecting device comprises an adapter having a mounting portion which fits the hot shoe and a receiving portion which receives the mounting portion of the strobe device, at least a first terminal and a second terminal being provided on the receiving portion. When the strobe device is mounted on the camera with use of the adapter, the first and second terminals respectively contact the X and Q terminals provided on the mounting portion of the strobe device, the X contact provided on the hot shoe being insulated from the first terminal, the Q contact being provided on the hot shoe being connected to the second terminal, and wherein the adapter is provided with a cable which connects the first terminal and the X contact provided on the lens having the lens shutter mechanism.

Alternatively, the connecting device may have a cable extending from a first end to a second end, the cable branching at midst portion between the first end and the second end to be a branch cable, the branch cable having a third end, and wherein at least a first and a fourth terminals are provided at the first end, at least a second terminal is provided at the second end, and at least a third terminal is provided at the third end, the first terminal and the second terminal being electrically connected, the third terminal and the fourth terminal being electrically connected, and wherein the first end of the cable is coupled to the strobe device such that the first terminal and the fourth terminal contact the Q terminal and the X terminal of the strobe device, respectively, the second end of the cable is coupled to the camera body such that the second terminal contacts the Q contact of the camera body, and the third end is coupled to the lens such that the third terminal contacts the X contact of the lens.

Further optionally, the shutter system comprises a focal plane shutter.

The light amount detecting system may have an optical element which output an electrical current corresponding to a received intensity of light, and an integrating circuit which integrates the electrical current output by the optical element.

With this construction, the integrating circuit may start integrating when the shutter system of the camera body has been driven to open.

Further, the light amount detecting system may compare an integrated value output from the integrating circuit with a reference value, and outputs the predetermined signal when the integrated value exceeds the reference value.

According to another aspect of the invention, there is provided an adapter for a strobe device to be coupled with a camera employing an interchangeable lens system, comprising a first member which electrically connects an X terminal of the strobe device with an X contact of a lens mounted to the camera, and a second member which electrically connects a Q terminal of the strobe device with a Q contact of the camera body.

When a predetermined signal is transmitted from the X contact of the lens to the X terminal of the strobe device through the strobe device, the strobe device starts emitting light, and when a predetermined signal is transmitted from the Q contact of the camera body to the Q terminal of the strobe device, the strobe device stops emitting light.

According to a further aspect of the invention, there is provided a method of executing a strobe-synchronized photographing for a camera body having a focal plane shutter mechanism, and a lens coupled to the camera body, and has a lens shutter mechanism, the method comprising closing the lens shutter; opening the focal plane shutter; opening the lens shutter; starting detection of the light amount incident to a film; applying an X signal to a strobe device; determining whether a predetermined amount of light has been incident to the film; applying a Q signal to the strobe device when the predetermined amount of light has been incident to the film; closing the lens shutter; closing the focal plane shutter; and opening the lens shutter.

DESCRIPTION OF THE ACCOMPANYING DRAWINGS

DESCRIPTION OF THE EMBODIMENT

An embodiment of the present invention will be described with reference to the accompanying drawings.

Figure 1:
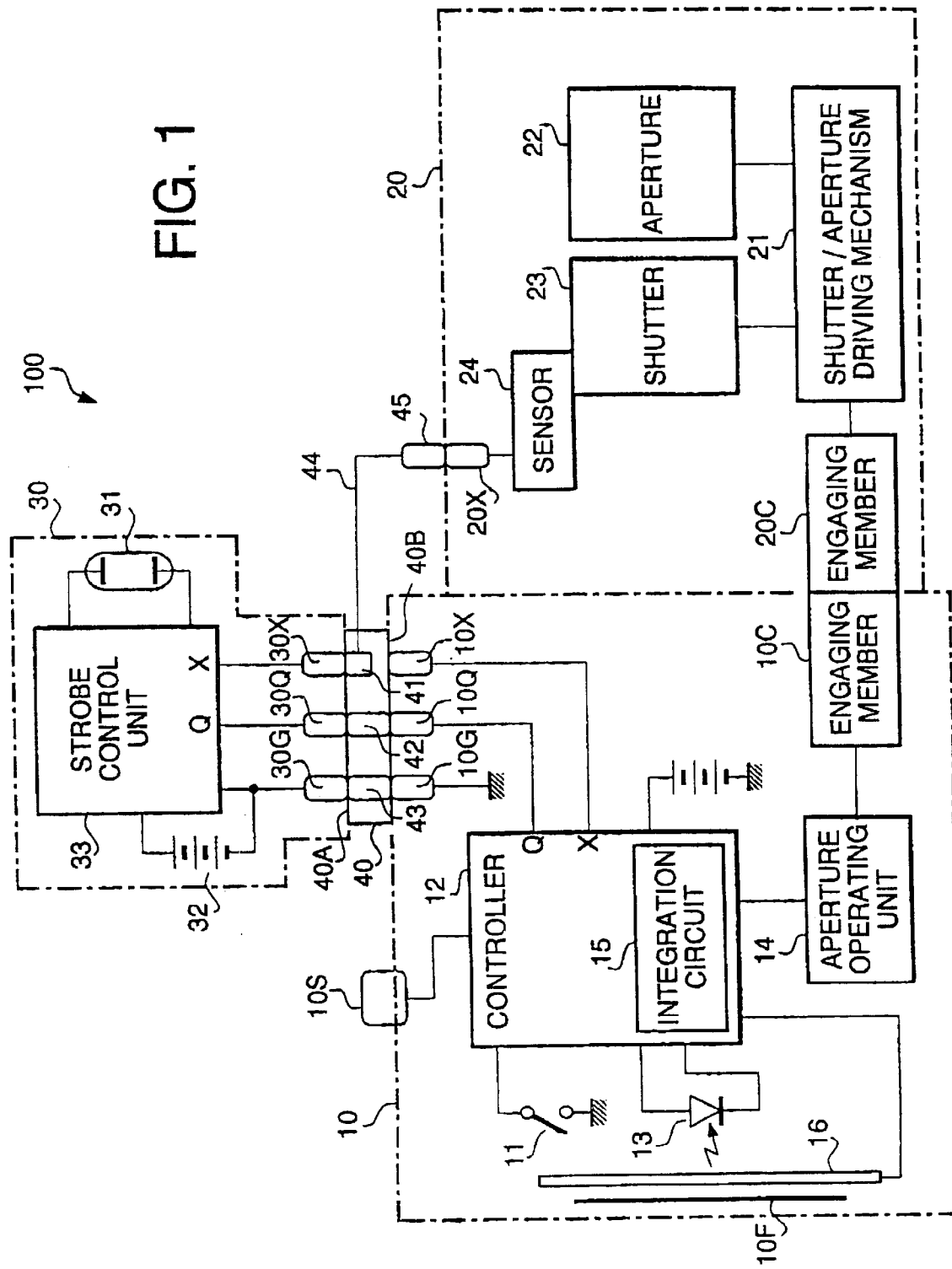
FIG. 1 is a block diagram showing a control system of the automatic strobe system which is the embodiment of the invention.
Figure 2:
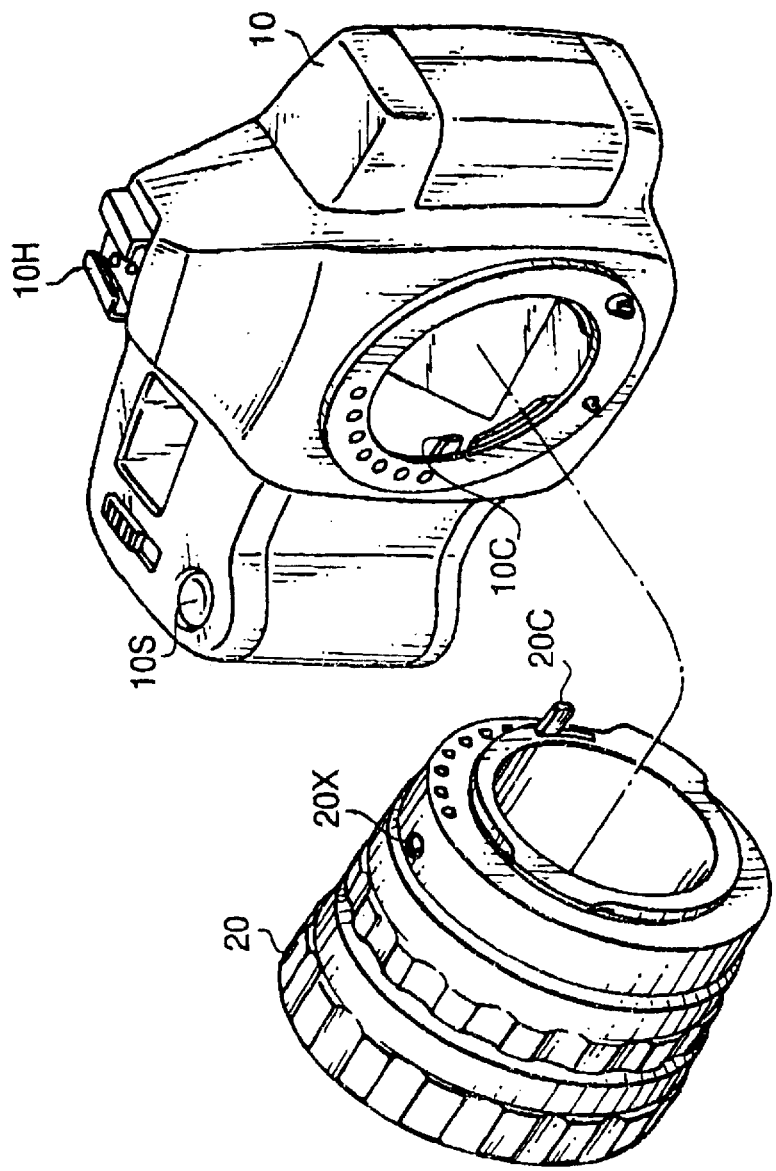
FIG. 2 shows an appearance of a camera body and a lens.
Figure 3:
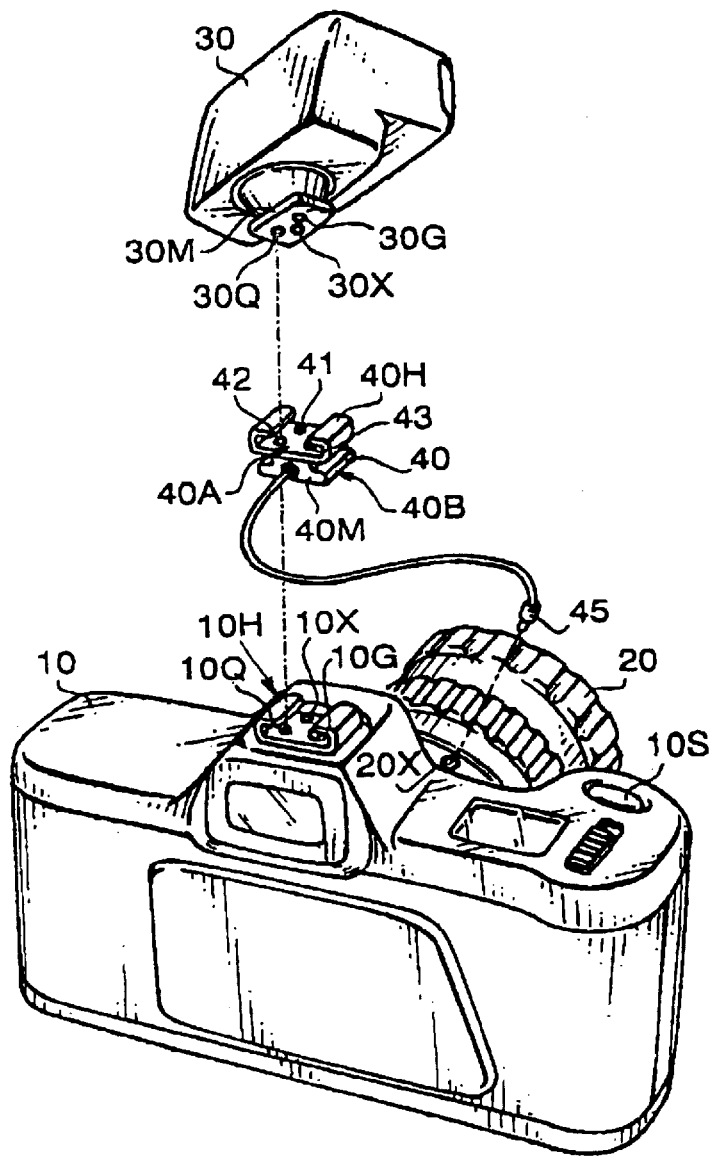
FIG. 3 shows an appearance of the camera system having a camera body, a strobe device and an adaptor.

FIG. 1 is a block diagram showing a control system of a automatic strobe photographing system 100 embodying the present invention. FIG. 2 shows an appearance of a camera body 10 and a lens 20 having a lens shutter mechanism, the lens 20 being detached from the camera. FIG. 3 shows an appearance of the automatic strobe photographing system 100 including the camera body 10, the lens 20 mounted to the camera body 10, an external strobe device 30 and an adaptor 40 with which the strobe is connected to the photographing system.

As shown in FIG. 1, the external strobe device 30 has a xenon tube 31, a battery unit 32, and a strobe control unit 33. The strobe control unit 33 is connected to an X signal input terminal 30X, and a Q signal input terminal 30Q. When the X signal is input through the X signal input terminal 30X to the strobe control unit 33, the strobe control unit 33 starts emitting light from the xenon tube 31. Further, when the Q signal is input to the strobe control unit 33 through the Q signal input terminal 30Q, the strobe control unit 33 stops emitting light from the xenon tube 31. The strobe control unit 33 further executes charging operation while the xenon lamp 31 is turned OFF with use of the battery unit 32.

As shown in FIG. 3, a mounting section 30M is unitarily formed at the bottom of the strobe device 30. The mounting section 30M is to be coupled to a hot shoe 10H which is provided on the upper surface of the camera body 10. The X signal input terminal 30X, the Q signal input terminal 30Q, and a ground terminal 30G is exposed on the bottom surface of the mounting section 30M, and are brought into contact with corresponding terminals 10X, 10Q and 10G provided and exposed on the surface of the hot shoe 10H. The terminals 10X, 10Q and 10G will be described later.

The camera body 10 has a focal plane shutter system 16 (see FIG. 1), and a photo sensor 13 which integrates light incident past through the lens 20 and reflected from film surface 10F, and determines the amount of light incident on the film surface 10F (i.e., performs a TTL photometry operation).

When a normal lens (a lens which does not have a lens shutter mechanism) is used and a strobe photographing is executed, the camera 10 works as follows.

When a user depresses a shutter button 10S, the leading curtain of the focal plane shutter system 16 runs, and the film surface 10F is exposed to light. When the leading curtain of the focal plane shutter system 16 is fully opened, a switch 11 shown in FIG. 1 is turned ON. In response to turning ON of the switch 11, the controller 12 outputs the X signal, which is a trigger signal for initiating light emission of the strobe light, to a camera side X terminal 10X. Then the X signal is transmitted to the terminal 30X of the strobe device 30.

The light reflected by the film surface 10F is received by a photo diode 13, and an electrical current corresponding to the intensity of the received light is generated. The current generated by the photo diode 13 is supplied to an integration circuit 15 included in the controller 12. The integration circuit 15 starts integration synchronously with the turning ON of the switch 11. Accordingly, the integration starts synchronously with the full opening of the focal plane shutter (i.e., the full open of the leading curtain). When the integrated value reaches a predetermined reference value (i.e., the integrated exposure light amount on the film surface 10F reaches the predetermined reference value), the controller 12 outputs the Q signal, or the quench signal, which is a control signal, to the Q signal terminal 10Q. Accordingly, the Q signal is transmitted to the Q terminal 30Q of the strobe device 30. When the exposure of the film plane is finished, the trailing curtain of the focal plane shutter runs to close a picture frame. Note that the operation of the camera body 10 as described above is unchanged even when the lens shutter type lens is used instead of the normal lens.

As described above, on the upper surface of the camera body 10, the hot shoe 10H is provided. When strobe photographing is performed with use of the normal lens, the mounting section 30M of the strobe device 30 is mounted onto the hot shoe 10H. The X terminal 10X, the Q terminal 10Q, and the ground terminal 10G are exposed on the surface of the hot shoe 10H. When the mounting section 30M of the strobe device 30 is attached to the hot shoe 10H, the X terminal 10X, the Q terminal 10Q, and the ground terminal 10G contacts the X terminal 30X, the Q terminal 30Q, and the ground terminal 30G, respectively.

An aperture operating unit 14, under control of the controller 12, drives the camera side engaging mechanism 10C which engages with a lens side engaging mechanism 20C, upon depression of the shutter button 10S. The lens side engaging mechanism 20C is connected with a shutter/aperture driving mechanism 21 provided inside the lens 20. When the lens side engaging mechanism 20C is driven as the camera side engaging member 10C is driven to move, a driving force is transmitted to the shutter/aperture driving mechanism 21, which drives the aperture 22 and the lens shutter 23 in accordance with a predetermined sequence. In the lens 20, a sensor 24 for detecting a full open condition of the lens shutter 23 is provided. The sensor 24 outputs the X signal to the X terminal 20X of the lens 20 when the full open condition of the lens shutter 23 is detected.

As described above, when strobe photographing is executed with the use of the normal lens, the mounting section 30M of the strobe device 30 is directly mounted onto the hot shoe 10H. When the lens 20 having the shutter lens mechanism is used and the strobe-synchronized photographing is executed, an adapter 40 is used. Specifically, the mounting section 30M of the strobe device 30 is attached to the attaching portion 40H of the adapter 40, and a mounting section 40M of the adapter 40 is mounted onto the hot shoe 10H. Thus, the strobe device 30 is mounted onto the camera body 10 via the adapter 40 inserted therebetween.

As described before and as shown in FIG. 3, on the bottom surface of the mounting section 30M of the strobe device 30, the X and signal input terminal 30X, the Q signal input terminal 30Q and the ground terminal 30G are provided with being partially exposed from the bottom surface.

As shown in FIG. 1, adapter 40 has three terminals 41, 42 and 43, on the surface of the strobe mounting section 40H (see FIG. 3). The three terminals 41, 42 and 43 contact terminals 30X, 30Q and 30G, respectively, when the mounting section 30M of the strobe device 30 is coupled to the adapter 40 and the bottom surface of the mounting section 30M is brought into contact with the strobe mounting section 40H.

The terminals 42 and 43 are also exposed on the other surface 40B of the adapter 40. With this construction, when the mounting section 40M of the adapter is attached to the hot shoe 10H, terminals 42 and 43 respectively contact the Q terminal 10Q and the ground terminal 10G. Terminal 41 is not exposed on the bottom surface 40B of the mounting section 40M, however to be connected to a connector terminal 45 through a cable 44. The connector terminal 45 is connected to the S terminal 20X of the lens 20.

Accordingly, as shown in FIG. 3, by attaching the strobe device 30 to the hot shoe 10H via the adapter 40, the X input terminal 30X of the strobe device 30 is electrically connected to the lens side X terminal 20X of the lens shutter lens 20, the Q signal input terminal 30Q and the ground terminal 30G of the strobe device 30 are electrically connected to camera side Q terminal 10Q and the ground terminal 10G, respectively.

Figure 4:
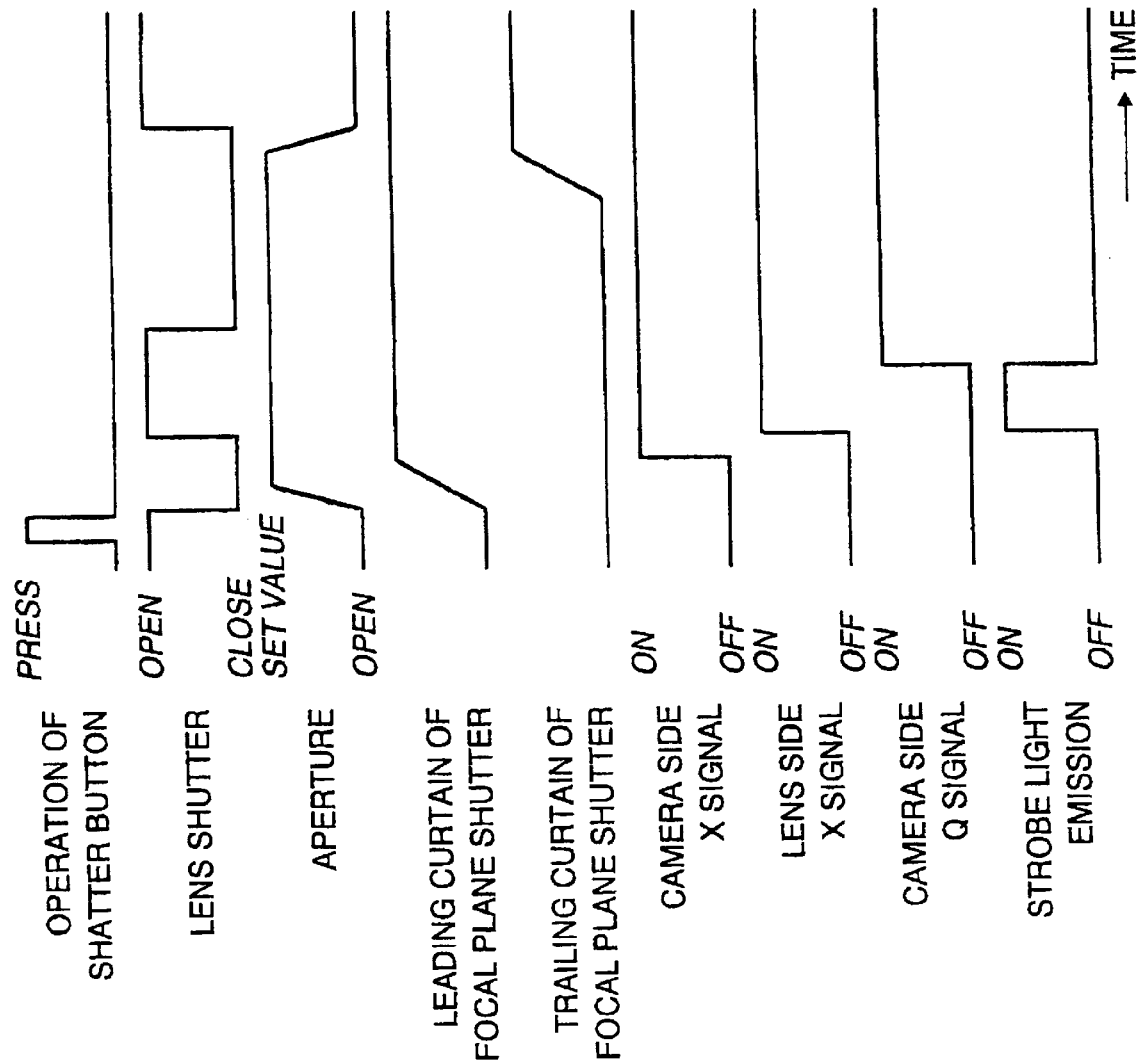
FIG. 4 is a timing chart showing the operation of the automatic strobe system.

Operation of the camera body 10, lens 20, adaptor 40 and the strobe device 30 will be described with reference to a timing chart shown in FIG. 4.

When the shutter button 10S of the camera body 10 is depressed, the controller 12 controls the aperture driving unit 14 to drive the camera side engaging member 10C. As the camera side engaging member 10C is driven to be moved, the lens side engaging member 20C is operated thereby. As the lens side engaging member 20C is operated, the shutter/aperture driving mechanism 21 is driven, which closes the shutter 23 provided inside the lens 20, and at the same time, the aperture 22 is set from its open state to a set value.

After the shutter 23 inside the lens 20 is completely closed, the leading curtain of the focal plane shutter inside the camera body 10 runs and the focal plane shutter fully opens. When the focal plane shutter is fully opened, switch 11 is turned ON, and in response to the turning ON of switch 11, the X signal is transmitted to the camera side X terminal 10X (i.e., the camera side X terminal is set to a high level). However, the camera side X terminal 10X is not electrically connected to the terminal 41 of the adapter 40, the X signal generated as the focal plane shutter is fully opened is not transmitted to the strobe device 30.

As described above, the X signal which is generated due to the full open of the focal plane shutter is also used as a trigger signal for initiating the integration of the integration circuit 15 of the controller 12. Accordingly, the controller 12 starts integrating of the light reflected by the film plane as soon as the focal plane shutter fully opens (i.e., in response to the X signal generated inside the camera 10). It should be noted that at the beginning of the integration, as the lens shutter 23 stays closed, there is no reflected light from the film plane 10F, and therefore a substantial integration has not yet started.

After the leading curtain of the focal plane shutter fully opens, the shutter sector 23 of the lens shutter 23 opens. Note that the shutter/aperture driving mechanism 21 once closes the lens shutter 23 upon depression of the release button 10S. Then, after the aperture size is set, and a period of time sufficient for the focal plane shutter to fully open elapses, the shutter/aperture driving mechanism 21 starts opening the lens shutter 23.

When lens shutter 23 fully opens, the sensor 24 detects the full open status of the lens shutter 23, and transmits the X signal to the X terminal 20X (i.e., the lens side X signal is turned ON). Since the lens side X terminal 20X is electrically connected to the X signal input terminal 30X through terminal 45 of the adapter 40, cable 44, terminal 41, when the X signal is output from the lens side X terminal 20X, the X signal is transmitted to the input terminal 30X of the strobe device 30, and the strobe controller 33 starts light emission of the strobe device 30.

As described before, the integrating circuit 15 started the integrating operation as the focal plane shutter fully opened. Therefore, when the lens shutter 23 is opened, light is incident to the film plane through the lens 20, and the integration is executed. If the integrated value reaches a predetermined reference value (i.e., the film plane is sufficiently exposed to light), the controller 12 outputs a quench signal for stopping the light emission of the strobe device 30 (i.e., the Q signal is turned ON). The Q terminal 10Q of the camera 10 is electrically connected to the Q signal input terminal of the strobe device 30 through the terminal 42 of the adapter 40, the Q signal is transmitted to the Q signal input terminal 30Q. Upon receiving the Q signal, the strobe controller 33 stop emitting light of the xenon tube 31.

A predetermined exposure period has passed, the controller 12 controls the aperture driving unit 14 to drive the engaging member 10C in the direction opposite to that when the exposure starts. As the engaging member 10C is operated, the engaging member 20C is driven to close the shutter 23 of the lens 20 via the shutter/aperture driving mechanism 21 to stop the exposure operation. Then, after the shutter 23 is closed, the controller 12 controls the trailing curtain of the focal plane shutter to close the focal plane shutter. Thereafter, aperture 22 of the lens 20 becomes fully opened through the aperture driving unit 14, engaging member 10, engaging member 20, and further the shutter 23 returns its fully opened status.

The above described sequence illustrates the operation when the lens shutter lens 20 is used. If the normal lens is used, a normal strobe-synchronized photographing includes the steps of:

setting the aperture of the normal lens upon operation of the shutter button 10S;

running the leading curtain of the focal plane shutter;

outputting the X signal when the leading curtain is fully opened;

starting integration, and light emission of the strobe light;

outputting the quench signal;

stopping light emission of the strobe device;

running the trailing curtain of the focal plane shutter; and fully opening the aperture.

Note that when the normal lens is used, the adapter 40 is not used and the light emission of the strobe device 30 is controlled based on the X and Q signals both output by the camera body 10.

Figure 5:
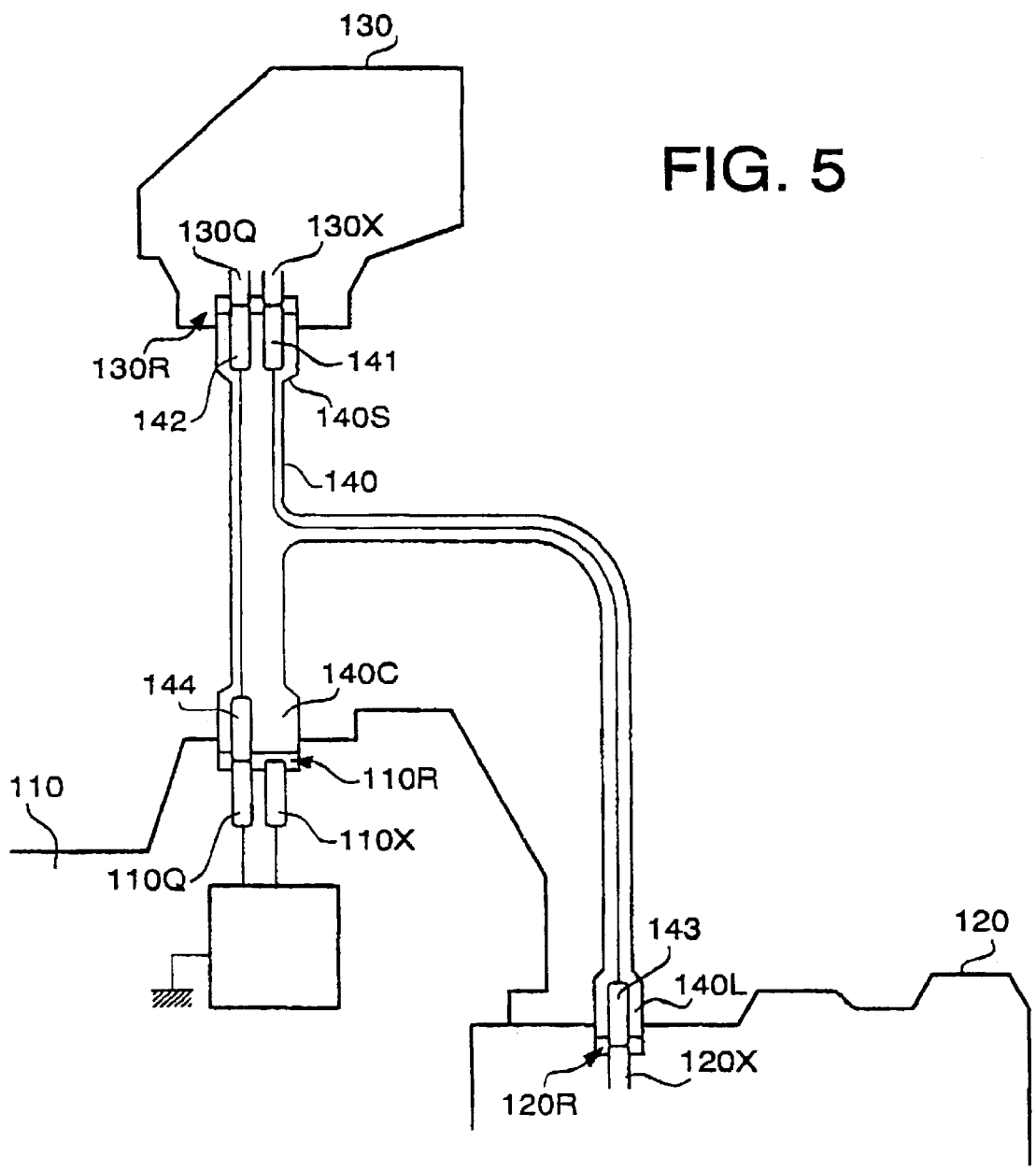
FIG. 5 shows a second embodiment of the auto-strobe system.
Figure 6:
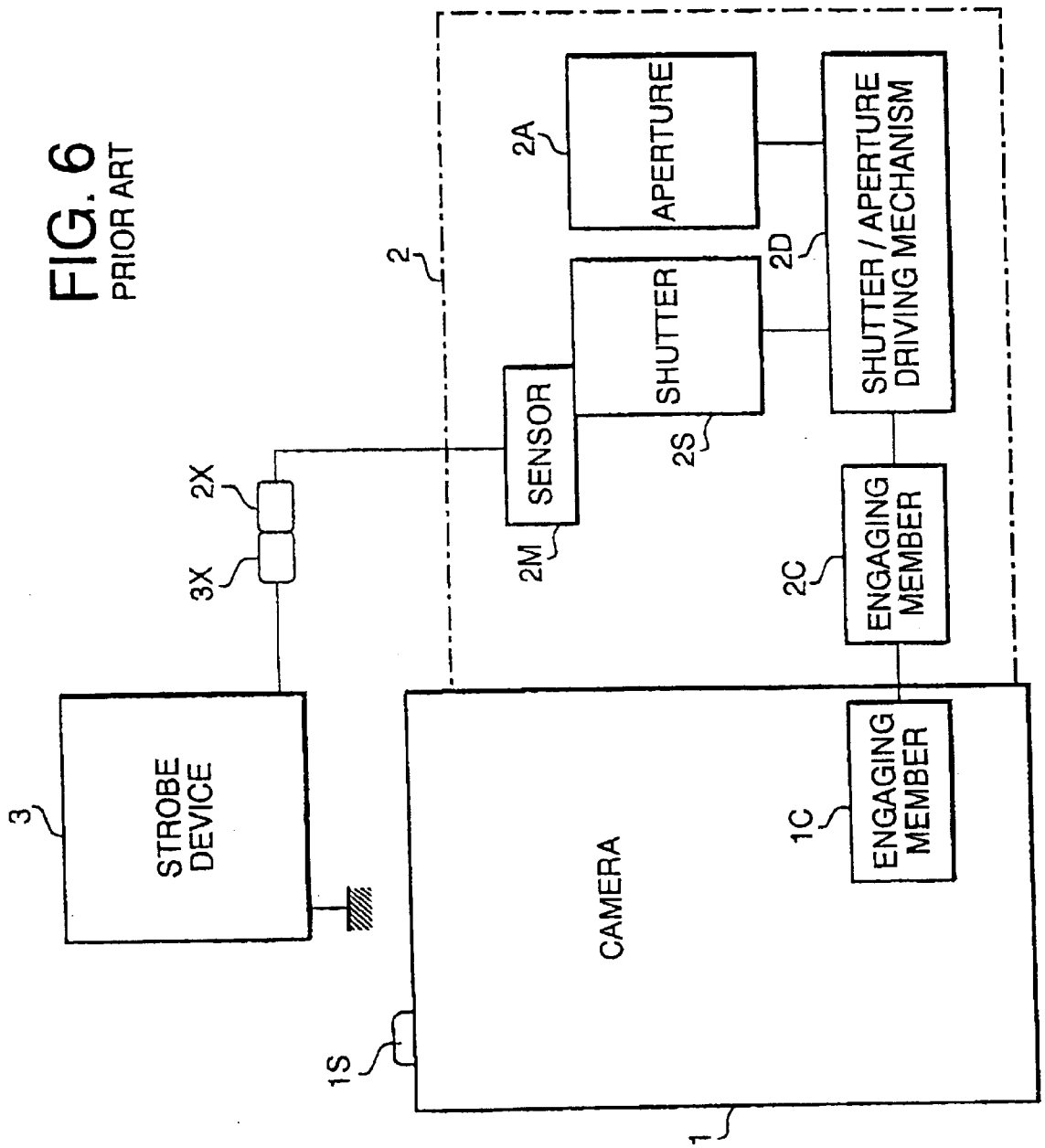
FIG. 6 is a block diagram showing a conventional strobe photographing system.

FIG. 5 shows a second embodiment of the auto-strobe system. In the second embodiment, a camera 110, a lens 120 and a strobe device 130 are interconnected with a rigid adapter with integral cable 140.

As shown in FIG. 5, according to the second embodiment, a receptacle 110R provided with an X terminal for outputting the X signal, and a Q terminal 110Q for outputting the Q signal is formed on the surface of the camera 110. On the strobe device 130, a receptacle 130R having an X terminal for receiving the X signal, and a Q terminal 130Q for receiving the Q signal is formed. On the lens 130 having the lens shutter, a receptacle 120R having an X terminal 120X for outputting the X signal is provided.

The rigid adapter with integral cable 140 has a following structure. A connector 140S to be inserted in the receptacle 130R has an X terminal 141 and a Q terminal 142, respectively, that contact the X terminal 130X and the Q terminal 130Q. The lines connected to terminals 141 and 142 branch at midst portion thereof. One line connects Q terminal 142 to a terminal 144 which is provided at the connector 140C which is to be inserted in the receptacle 110R. Another line connects terminal 141 to a terminal 143 which is provided at a connector 140L to be inserted in the receptacle 120R or the lens 120.

As the connector 140C is inserted in the receptacle 110R, terminal 144 contacts the Q terminal 110Q. As the connector 140L is inserted in receptacle 120R, terminal 143 contacts the X terminal 120X. Thus, the X terminal 130X of the strobe device 130 is electrically connected to the X terminal 120X of the lens 120, and the Q terminal 130Q of the strobe device 130 is electrically connected to the Q terminal 110Q of the camera 110.

With the above-described structure, the strobe 130 starts light emission when the X terminal 130X receives the X signal from the X terminal 120X of the lens 120, and stops light emission when the Q terminal 130Q receives the Q signal from the Q terminal 110Q of the camera 110. That is, when the lens shutter provided inside the lens fully opens, the X signal is transmitted to the strobe device 130, and when the amount of light incident to the film reaches a predetermined value, which is detected with use of the integration circuit as is in the first embodiment, the camera 110 transmits the Q signal to the strobe device 130 to stop emitting light.

Note that in the second embodiment, although it is not described in detail, the operation of the focal plane shutter (i.e., operation of the leading and trailing curtains) of the camera 110 in connection with the operation of the release button is similar to that in the first embodiment. Therefore, the sequence of the strobe-synchronized photographing form the operation of the shutter button to the end of the exposure is similar to the sequence shown in FIG. 4. Accordingly, in the second embodiment, as well as in the first embodiment, a high-speed strobe-synchronized photographing can be performed with using the lens shutter lens.

In order to simplify the illustration, grounding terminals and lines connecting the grounding terminals are not shown in FIG. 5, it should be noted that a strobe grounding terminal is provided at receptacle 130R, camera grounding terminal is provided at receptacle 110R, and a line connecting the strobe and camera grounding terminals are enclosed.

As described above, according to the auto-strobe system according to the present invention, even if a lens having a lens shutter is attached to a camera having a focal plane shutter and a strobe TTL photometry system, light emission of the strobe device can be accurately controlled, and therefore, a high-speed strobe-synchronized photographing can be executed. Further, with use of the strobe adapter illustrated in the first embodiment and/or the cable illustrated in the second embodiment, the above-described high-speed strobe-synchronized photographing can be achieved without modifying the conventional camera body, strobe device and the lens.

The present disclosure relates to subject matter contained in Japanese Patent Application No. HEI 7-328288, filed on Nov. 22, 1995, which is expressly incorporated herein by reference in its entirety.

What is claimed is:

1. An automatic strobe photographing system, comprising:
   a camera body having an X contact and a Q contact;
   a lens provided with a lens shutter mechanism, said lens having an X contact;
   a strobe device having an X terminal and Q terminal, said strobe device emitting light when a predetermined signal is input to said X terminal, said strobe device being prevented from emitting light when a predetermined signal is input to said Q terminal; and
   a connecting device which connects said X contact of said lens with said X terminal of said strobe device, and connects said Q contact with said Q terminal, said connecting device electrically isolating said X contact of said camera body from said X terminal of said strobe device.

2. The automatic strobe photographing system according to claim 1, wherein said camera has a light amount detecting system, said predetermined signal being output from said Q contact when said light amount detecting system detects that a predetermined amount of light is incident to said camera body through said lens.

3. The automatic strobe photographing system of claim 1, further comprising:
   a ground contact associated with said camera body; and
   a ground terminal associated with said strobe device, said connecting device connecting said ground contact to said ground terminal.

4. The automatic strobe photographing system according to claim 1, wherein said light amount detecting system comprises an optical element which outputs an electrical current corresponding to a received intensity of light, and an integrating circuit which integrates said electrical current output by said optical element.

5. The automatic strobe photographing system according to claim 4, wherein said integrating circuit starts integrating when said shutter system of said camera body has driven to fully open.

6. The automatic strobe photographing system according to claim 4, wherein said light amount detecting system compares an integrated value output from said integrating circuit with a reference value, and outputs said predetermined signal when said integrated value exceeds said reference value.

7. The automatic strobe photographing system according to claim 1, wherein said camera body further comprises a shutter system, and an X contact, a predetermined signal being output from said X contact when said shutter system is respectively, said second end of said cable is coupled to said camera body such that said second terminal contacts said Q contact of said camera body, and said third end is coupled to said lens such that said third terminal contacts said X contact of said lens.

8. The automatic strobe photographing system according to claim 7, wherein said shutter system comprises a focal plane shutter.

9. The automatic strobe photographing system according to claim 7, which employs an interchangeable lens system, and wherein, when a lens which does not have said lens shutter mechanism is coupled to said camera body, said X terminal and said Q terminal of said strobe device are connected to said X contact and said Q contact provided on said camera body, respectively.

10. The automatic strobe photographing system according to claim 9, wherein said camera body has a hot shoe where said X and Q contacts are provided, said strobe having a mounting portion to be coupled to said hot shoe, said X terminal and said Q terminal being provided on said mounting portion of said strobe device such that said X terminal and said Q terminal of said strobe device contact said X contact and said Q contact of said camera body when said mounting portion is directly coupled to said hot shoe.

11. The automatic strobe photographing system, comprising:

a camera body having a hot shoe provided with a first X contact and a Q contact;

a lens provided with a lens shutter mechanism, said lens having a second X contact;

a strobe device having an X terminal and Q terminal, said strobe device emitting light when a predetermined signal is input to said X terminal, said strobe device being prevented from emitting light when a predetermined signal is input to said Q terminal; and a connecting device which connects said second X contact with said X terminal, and said Q contact with said Q terminal, said strobe having a mounting portion selectively coupled to said hot shoe, said X terminal and said Q terminal being provided on said mounting portion of said strobe device such that said X terminal and said Q terminal of said strobe device contact said first X contact and said Q contact of said camera body when said mounting portion is directly coupled to said hot shoe, said connecting device comprising an adapter having a mounting portion which fits said hot shoe and a receiving portion which receives said mounting portion of said strobe device, at least a first terminal and a second terminal being provided on said receiving portion, wherein, when said strobe device is mounted on said camera with said adapter, said first terminal and said second terminal contact said X terminal and said Q terminal provided on said mounting portion of said strobe device, said first X contact provided on said hot shoe being insulated from said first terminal, said Q contact provided on said hot shoe being connected to said second terminal, said adapter being provided with a cable which connects said first terminal with said second X contact provided on said lens having said lens shutter mechanism.

12. The automatic strobe photographing system, comprising:

a camera body having at least a Q contact;

a lens provided with a lens shutter mechanism, said lens having an X contact;

a strobe device having an X terminal and Q terminal, said strobe device emitting light when a predetermined signal is input to said X terminal, said strobe device being prevented from emitting light when a predetermined signal is input to said Q terminal; and a connecting device which connects said X contact with said X terminal, and said Q contact with said Q terminal, wherein said connecting device comprises a rigid adapter with an integral cable extending from a first end to a second end, said cable branching at a mid portion between said first end and said second end to be a branch cable, said branch cable having a third end, and wherein at least a first terminal and a fourth terminal are provided at said first end, at least a second terminal being provided at said second end, and at least a third terminal being provided at said third end, said first terminal and said second terminal being electrically connected, said third terminal and said fourth terminal being electrically connected, and wherein said first end of said cable is coupled to said strobe device such that said first terminal and said fourth terminal contact said Q terminal and said X terminal of said strobe device, respectively, said second end of said cable being coupled to said camera body such that said second terminal contacts said Q contact of said camera body, said third end being coupled to said lens such that said third terminal contacts said X contact of said lens.

13. An adapter for a strobe device to be coupled with a camera employing an interchangeable lens system, comprising:

a first member which electrically connects an X terminal of said strobe device with an X contact of a lens mounted to said camera; and a second member which electrically connects a Q terminal of said strobe device with a Q contact of said camera body, said adapter electrically isolating an X contact of said camera body from said X terminal of said strobe device.

14. The adapter according to claim 13, wherein when a predetermined signal is transmitted from said X contact of said lens to said X terminal of said strobe device through said strobe device, said strobe device starts emitting light, and wherein when a predetermined signal is transmitted from said Q contact of said camera body to said Q terminal of said strobe device, said strobe device stops emitting light.

15. A method of executing strobe-synchronized photographing for a camera body having a focal plane shutter mechanism, and a lens coupled to said camera body, and has a lens shutter mechanism, comprising:

closing a lens shutter;

opening the focal plane shutter mechanism, in which an X signal from the camera body is electrically isolated from a strobe device;

opening the lens shutter;

starting a detection of a light amount incident to a film;

applying an X signal from the lens to a strobe device to start an emission of light;

determining whether a predetermined amount of light is incident to the film;

applying a Q signal from the camera body to the strobe device to stop the emission of light when the predetermined amount of light is determined to be incident to the film;

closing the lens shutter;

closing the focal plane shutter mechanism; and opening the lens shutter.

* * * * *

UNITED STATES PATENT AND TRADEMARK OFFICE
CERTIFICATE OF CORRECTION

PATENT NO. : 5,848,306
DATED : December 8, 1998
INVENTOR(S) : T. SHONO

It is certified that error appears in the above-identified patent and that said Letters Patent is hereby corrected as shown below:

At column 10, lines 42-46 (claim 7, lines 5-9) of the printed patent, after "is" delete ---respectively, said second end of said cable is coupled to said camera body such that said second terminal contacts said Q contact of said camera said body, and said third end is coupled to said lens such that said third terminal contacts said X contact of said lens--- and insert ---driven to fully open---.

Signed and Sealed this

Twenty-eighth Day of December, 1999

Attest:

Q. TODD DICKINSON

Attesting Officer

Acting Commissioner of Patents and Trademarks